(12) United States Patent
Delf (10) Patent No.: US 8,174,141 B2
(45) Date of Patent: May 8, 2012

(54) TURBO GENERATOR

(75) Inventor: Gerhard E. Delf, Ojai, CA (US)

(73) Assignee: Thingap, LLC, Ventura, CA (US)

(*) Notice: Subject to any disclaimer, the term of this patent is extended or adjusted under 35 U.S.C. 154(b) by 515 days.

(21) Appl. No.: 12/413,453

(22) Filed: Mar. 27, 2009

(65) Prior Publication Data

US 2009/0250933 A1 Oct. 8, 2009

Related U.S. Application Data

(60) Provisional application No. 61/040,433, filed on Mar. 28, 2008.

(51) Int. Cl.
*F01D 15/10* (2006.01)
*F02C 6/00* (2006.01)
*H02P 9/04* (2006.01)

(52) U.S. Cl. .......................................... 290/52; 60/597

(58) Field of Classification Search .................. 290/52, 290/40 C; 60/607, 608, 597; 180/304, 68.3; 310/216.002, 208, 254.1, 59, 60 A
See application file for complete search history.

(56) References Cited

U.S. PATENT DOCUMENTS

| | | | | |
|---|---|---|---|---|
| 3,134,535 A * | 5/1964 | Maier | ............................. | 416/174 |
| 3,970,881 A * | 7/1976 | Sato | ............................. | 310/68 D |
| 4,253,031 A * | 2/1981 | Frister | ............................. | 290/52 |
| 4,394,582 A * | 7/1983 | Kreissl et al. | ................. | 290/4 C |
| 4,503,679 A * | 3/1985 | Saito et al. | ..................... | 60/605.3 |
| 4,644,202 A * | 2/1987 | Kroy et al. | ....................... | 310/58 |
| 4,694,654 A * | 9/1987 | Kawamura | ....................... | 60/597 |
| 4,864,151 A * | 9/1989 | Wyczalek et al. | ................. | 290/52 |
| 5,313,127 A * | 5/1994 | Danley et al. | .................... | 310/36 |
| 5,682,070 A * | 10/1997 | Adachi et al. | .................... | 310/71 |
| 5,714,827 A * | 2/1998 | Hansson | ................. | 310/216.002 |
| 5,723,933 A * | 3/1998 | Grundl et al. | .................. | 310/266 |
| 5,857,332 A * | 1/1999 | Johnston et al. | ................. | 60/607 |
| 6,064,121 A * | 5/2000 | Shervington et al. | ......... | 290/1 A |
| 6,242,840 B1 * | 6/2001 | Denk et al. | ............. | 310/216.002 |
| 6,873,085 B2 * | 3/2005 | Graham et al. | ............... | 310/266 |
| 2004/0088977 A1 | 5/2004 | Huang | | |
| 2005/0062354 A1 * | 3/2005 | Iles-Klumpner | ......... | 310/156.53 |
| 2007/0024144 A1 * | 2/2007 | Obidniak | ................. | 310/156.36 |
| 2007/0228850 A1 * | 10/2007 | Misaki | ............................. | 310/85 |

* cited by examiner

*Primary Examiner* — Julio Cesar Gonzalez
(74) *Attorney, Agent, or Firm* — Arent Fox, LLP (57) ABSTRACT

A turbo generator having a turbine configured to be driven by exhaust gas from an internal combustion engine, and an electric generator having a rotor coupled to the turbine and a stator having an ironless coil arranged with the rotor to generate electric power when the rotor is rotated by the turbine.

79 Claims, 8 Drawing Sheets

TURBO GENERATOR

CROSS-REFERENCE TO RELATED APPLICATIONS

The present application claims priority to Provisional Application No. 61/040,433, filed Mar. 28, 2008.

BACKGROUND

1. Field

The present disclosure relates to a turbo generator powered by exhaust gas from an internal combustion engine.

2. Background

Electrical systems for motor vehicles have continued to evolve over the years. Today, these systems are often required to support an increasingly number of electrical components, such as servo motors, onboard computers, navigation systems, and entertainments systems, just to name a few. In addition, mechanical components, such as power steering pumps, air conditioning compressors, water pumps, oil pumps and other components traditionally driven by the engine's crankshaft, are more and more being electrically powered. As the demand for electrical power continues to increase, the use of traditional power generating means becomes less attractive. Not only in terms of physical size of the alternator required to meet this demand, but also in terms of additional fuel consuming load placed on the internal combustion engine at a time when fossil fuel is in short supply, the ecological consequences are great and the demand is for reduction in fuel consumption.

One possible solution is to generate electrical power from the exhaust gas energy of the internal combustion engine. A high-speed turbine mounted between the internal combustion engine and the exhaust system may be used to drive an electric generator. This solution may provide a number of benefits. For example, the fuel economy of the vehicle may be improved. The size of the crank shaft driven alternator may be reduced or the alternator may be eliminated, resulting in a reduction in engine fuel consumption and more compact and less expensive design. On hybrid vehicles, the turbine-driven generator may be used to supplement the supply of electric power for the electric drive system, reducing the on-time, and thus the filet consumption, of the internal combustion engine. In summary, all the electrical power generated by the turbo generator will result in a proportional direct reduction in engine fuel consumption.

Despite these benefits, it has proven to be difficult to integrate an efficient turbine-driven electrical generator in a motor vehicle. This is because conventional electric generators can deliver power only when operating within a specified speed range. The power delivered by a conventional electric generator falls off quickly when the operating speed exceeds the specified range, as is the case with the high rotational turbine speeds created by the internal combustion engine exhaust gas energy. As a result, this technique has not been applied widely to motor vehicles. The few applications that exist today are limited to large commercial vehicles (e.g., ships and large trucks) with a reduction gear mechanism at the output of the turbine to reduce the operating speed of the electric generator to the range required to produce power. This design requires a large space in engine compartment, making it unsuitable for standard passenger vehicles.

Accordingly, there is a need in the art for a system to generate electrical power from exhaust gas energy produced by an internal combustion engine suitable for standard passenger vehicle applications.

SUMMARY

In one aspect of the disclosure, a turbo generator includes a turbine configured to be driven by exhaust gas from an internal combustion engine, and an electric generator having a rotor coupled to the turbine and a stator having an ironless coil arranged with the rotor to generate electric power when the rotor is rotated by the turbine.

In another aspect of the disclosure, a turbo generator includes a turbine configured to be driven by exhaust gas from an internal combustion engine, and an electric generator having a rotor coupled to the turbine and a stator having an ironless coil surrounding the rotor.

In a further aspect of the disclosure, a turbo generator includes a turbine configured to be driven by exhaust gas from an internal combustion engine, and an electric generator having a rotor coupled to the turbine, and a stator having a slotless stack surrounding the rotor and a coil positioned between the rotor and the slotless stack.

In yet a further aspect of the disclosure, a turbo generator includes means for converting exhaust gas energy from an internal combustion engine to rotary power, and means for converting the rotary power to electric power using an ironless coil.

In yet another aspect of the disclosure, vehicle includes an internal combustion engine, and a turbo generator. The turbo generator includes a turbine configured to be driven by exhaust gas from the internal combustion engine, and an electric generator having a rotor coupled to the turbine and a stator having an ironless coil arranged with the rotor to generate electric power when the rotor is rotated by the turbine.

It is understood that other aspects of a turbo generator will become readily apparent to those skilled in the art from the following detailed description, wherein it is shown and described only exemplary configurations of a turbo generator. As will be realized, the invention includes other and different aspects of a turbo generator and the various details presented throughout this disclosure are capable of modification in various other respects, all without departing from the spirit and scope of the invention. Accordingly, the drawings and the detailed description are to be regarded as illustrative in nature and not as restrictive.

BRIEF DESCRIPTION OF THE FIGURES

Various aspects of the present invention are illustrated by way of example, and not by way of limitation, in the accompanying drawings, wherein.

DETAILED DESCRIPTION

The present invention is described more fully hereinafter with reference to the accompanying drawings, in which various aspects of a turbo generator are shown. This invention, however, may be embodied in many different forms and should not be construed as limited by the various aspects of the turbo generator presented herein. The detailed description of the turbo generator is provided below so that this disclosure will be thorough and complete, and will fully convey the scope of the present invention to those skilled in the art.

The detail description may include specific details for illustrating various aspects of a turbo generator. However, it will be apparent to those skilled in the art that the invention may be practiced without these specific details. In some instances, well known elements may be shown in block diagram form, or omitted, to avoid obscuring the inventive concepts presented throughout this disclosure.

Various aspects of a turbo generator may be illustrated by describing components that are coupled together. As used herein, the term "coupled" is used to indicate either a direct connection between two components or, where appropriate, an indirect connection to one another through intervening or intermediate components. In contrast, when a component referred to as being "directly coupled" to another component, there are no intervening elements present.

Various aspects of a turbo generator may be illustrated with reference to one more exemplary embodiments. As used herein, the term "exemplary" means "serving as an example, instance, or illustration," and should not necessarily be construed as preferred or advantageous over other embodiments of a turbo generator disclosed herein.

Several exemplary embodiments of a turbo generator will now be presented. In one exemplary embodiment, the turbo generator includes a turbine coupled to an electric generator to produce electrical power. The turbine includes a turbine wheel coupled to a turbine shaft. The turbine wheel is driven by exhaust gas from an internal combustion engine source. The turbine wheel is used to rotate the turbine shaft which is coupled to the electric generator. The electric generator includes a rotor having a rotor shaft that carries a permanent magnet. The rotor shaft is coupled to the turbine shaft. The electric generator also includes a stator having a slotless stack surrounding the permanent magnet. The stator also includes an ironless coil between the permanent magnet and the slotless stack. The slotless stack serves as part of the magnetic return path.

The various aspects of a turbo generator presented throughout this disclosure are well suited for integration into a standard passenger vehicle (i.e., automobile). However, as those skilled in the art will readily appreciate, these aspects may extended to other applications including, by way of example, commercial vehicles with internal combustion engines, aircraft and sea vessels with internal combustion engines, internal combustion engines driving stationary equipment (e.g., pumps, generators, etc.), or other suitable systems having an internal combustion engine source. Accordingly, any reference to an automotive system is intended only to illustrate various aspects of a turbo generator, with the understanding that these aspects have a wide range of applications.

Figure 1:
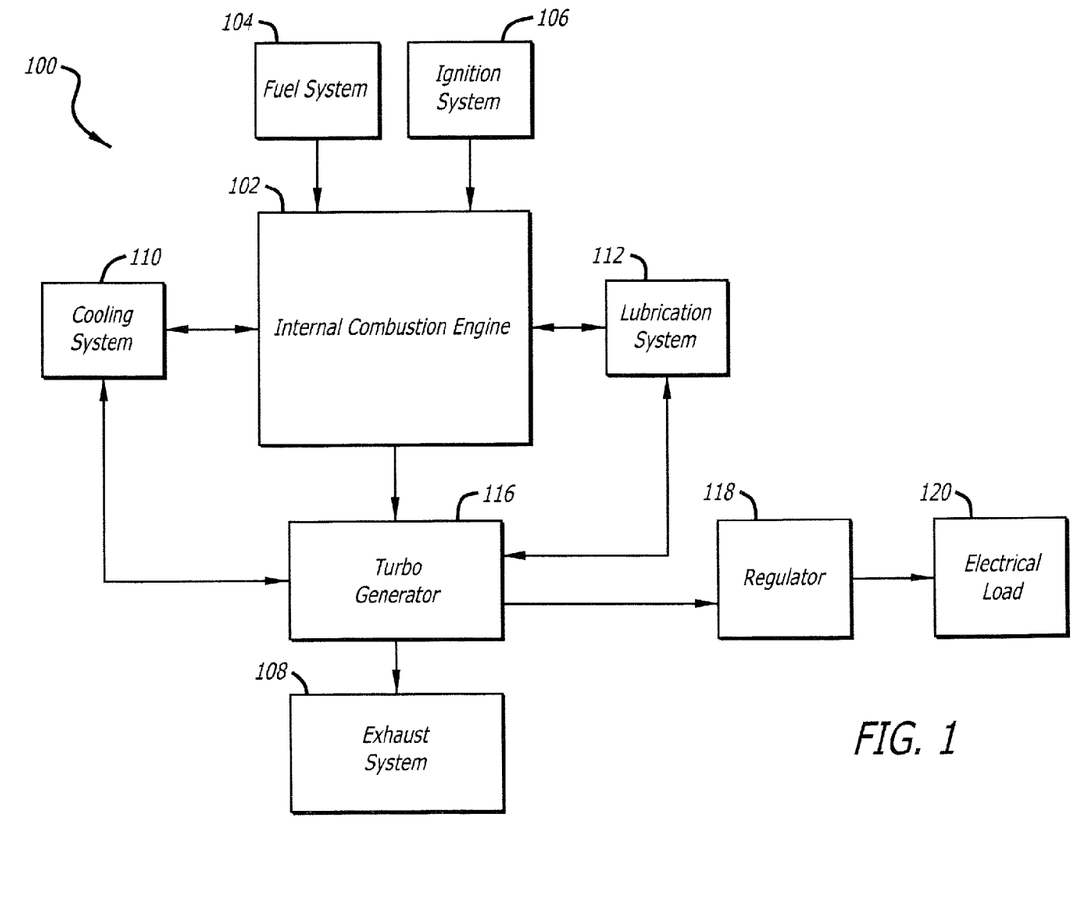
FIG. 1 is a functional block diagram illustrating an exemplary embodiment of an automotive system with a turbo generator.

FIG. 1 is a functional block diagram illustrating an exemplary embodiment of an automotive system with a turbo generator. The automotive system 100 includes an internal combustion engine 102 which, in this example, is used to provide power to a drive tram (not shown) to propel the vehicle. The automotive system 100 may also include a fuel system 104, an ignition system 106, an exhaust system 108, a cooling system 110, a lubrication system 112, a to generator 116, a regulator 118, and an electrical load 120, as well as other systems that are not shown.

The automotive system 100 described above is well known in the art, and therefore, will only be discussed briefly. The fuel system 104 may be used to provide the appropriate air-fuel mixture to the internal combustion engine 102. The air-fuel mixture may be combusted by the engine 102 when ignited by the ignition system 106 to provide power to the drive train (not shown). The exhaust gas produced from combustion of the air-fuel mixture in the engine 102 may be delivered to the atmosphere by the exhaust system 108. The cooling system 110 may be used to deliver a coolant to the engine 102 to dissipate heat generated from combustion. The lubrication system 112 may be used to deliver a lubricant to the moving parts in the engine 102.

The turbo generator 116 may be placed in the path of the exhaust gas flowing from the engine 102 to the exhaust system 108. As discussed above, the turbo generator 116 may include a turbine coupled to an electric generator to produce electrical power. The turbine may be a radial turbine as discussed in greater detail below, or some other suitable configuration. By way of example, the turbine may be an axial turbine. The electrical generator (not shown) may be directly powered by the turbine (not shown), which is driven by the exhaust gas from the internal combustion engine 102 at constantly changing rotational speeds in the range of 2,000 rpm to >200,000 rpm and at constantly changing power outputs. The electric generator may be a three-phase permanent magnet synchronous machine, which generates three-phase AC power at rotational speeds of 5,000 rpm to >200,000 rpm. Operation over this wide range of rotational speeds and power output may be achieved by a unique stator configuration that is described more fully below.

The three-phase AC power generated by the turbo generator 116 may be provided to the regulator 118, which rectifies and regulates the voltage before being distributed to the electric load 120. The electric load 120 represents the components in the vehicle requiring electrical power (e.g., the battery, servo motors, wiper motors, headlights, interior lights, instrumentation panels, fins, on-board computers, navigation systems, entertainment systems, etc.). The electrical load 120 also includes the ignition system 106, which is shown separately in FIG. 1 for clarity.

The lubrication system 112 may be used to deliver a lubricant to the moving parts in the turbo generator 116. The cooling system 110 may be used to deliver a coolant to the turbo generator 116 to protect the electric generator 120 from the heat generated by the exhaust gas flowing through the turbine.

Figure 2:
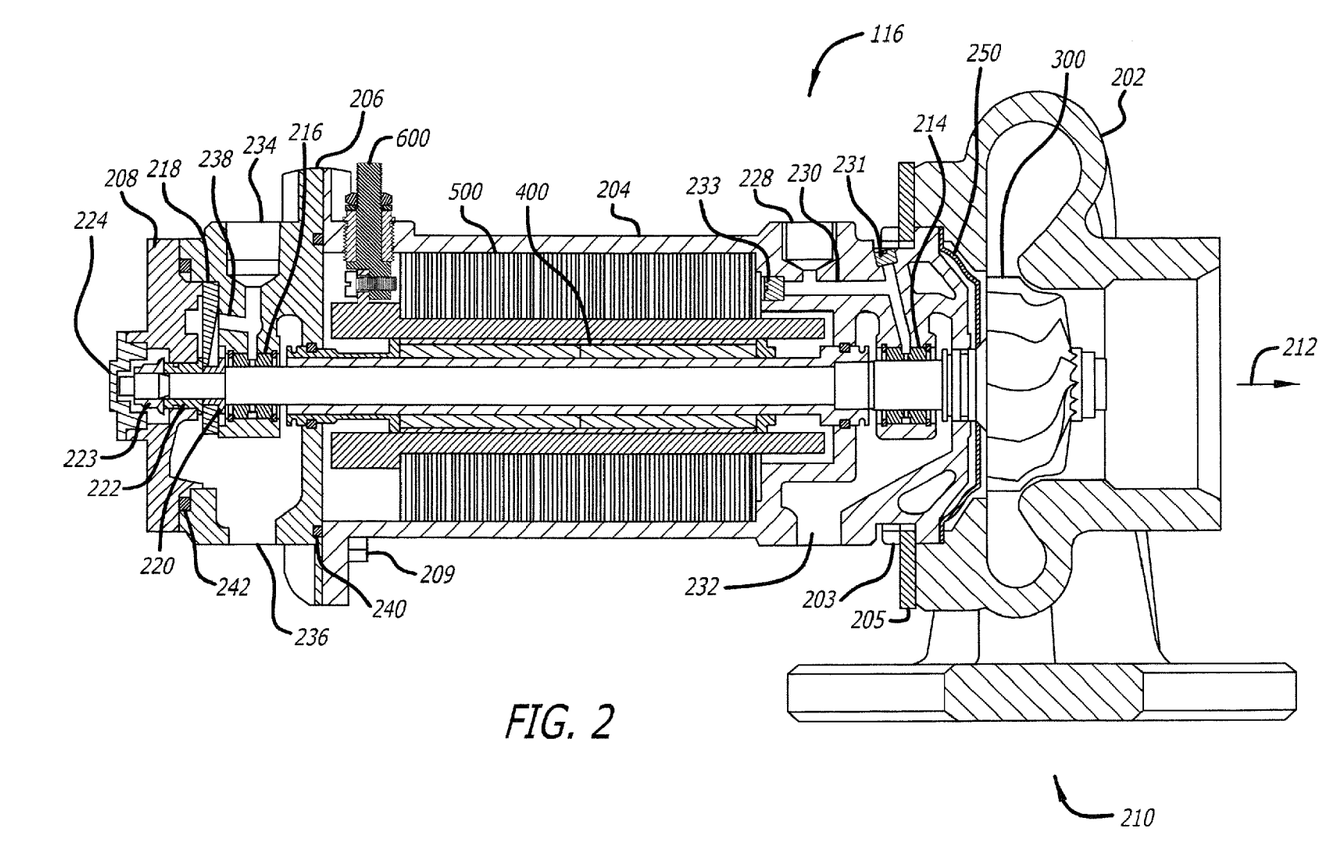
FIG. 2 is a cross-section side view of an exemplary embodiment of a turbo generator.

FIG. 2 is a cross-section side view of an exemplary embodiment of a turbo generator. The turbo generator 116 includes a housing comprising multiple sections. The multiple sections include a turbine housing section 202 and a generator housing section. The generator housing section is further divided into a first housing section 204 attached to a second housing section 206 with bolts 209. The turbine housing section 202 may be coupled to the generator housing section with bolts 203 that extend through a clamp plate 205. An end plate 208 may be attached to the distal end of the second housing section 206 with screws (not shown). The multiple section housing facilitates the assembly of the turbo generator 116, however, as those skilled in the art will readily appreciate, the housing may be constructed in any suitable fashion including a single unitary piece. The turbine housing section 202 may be high temperature resistant cast iron, high temperature resistant steel, or some other suitable material that can withstand the heat produced by the exhaust gas. The generator housing section may be aluminum, steel, cast iron, or other suitable material.

The turbine housing section 202 includes an input port 210 for attaching to an exhaust gas source, such as the exhaust manifold of an internal combustion engine. The turbine housing section 202 also includes an exhaust port 212 for discharging the exhaust gas. The exhaust port 212 may be attached to a pipe (not shown) or some other component that delivers the exhaust gas discharged from the turbine housing section 202 to the exhaust system for emission into the atmosphere.

The turbo generator 116 includes a turbine wheel assembly. The turbine wheel assembly is shown separately in the perspective side view in FIG. 3. The turbine wheel assembly 300 may be made of a high temperature resistant steel, or other suitable material. It includes a turbine wheel 302 configured to rotate in the turbine housing section 202 in response to exhaust gas flow from the internal combustion engine. The turbine wheel assembly 300 also includes a turbine shaft 304 that rotates with the turbine wheel 302. The turbine shaft 304 includes a piston ring 306, a slinger 307; a first bearing surface 308, a threaded coupling 310, and an elongated distal portion 312 having a second bearing surface 314.

The turbo generator 116 also includes an electric generator comprising a stator and a rotor. The rotor is shown separately in the cross-sectional side view of FIG. 4. The stator is shown separately in the cross-sectional side view in FIG. 5. The rotor 400 is shown with a hollow rotor shalt 402 carrying a permanent magnet 404 secure by first and second flanges 406, 408, respectively. The rotor shaft 402 may be steel, or some other suitable material. The permanent magnet 404 may be a single magnet or and arrangement of magnets on the rotor shaft 402.

Figure 4:
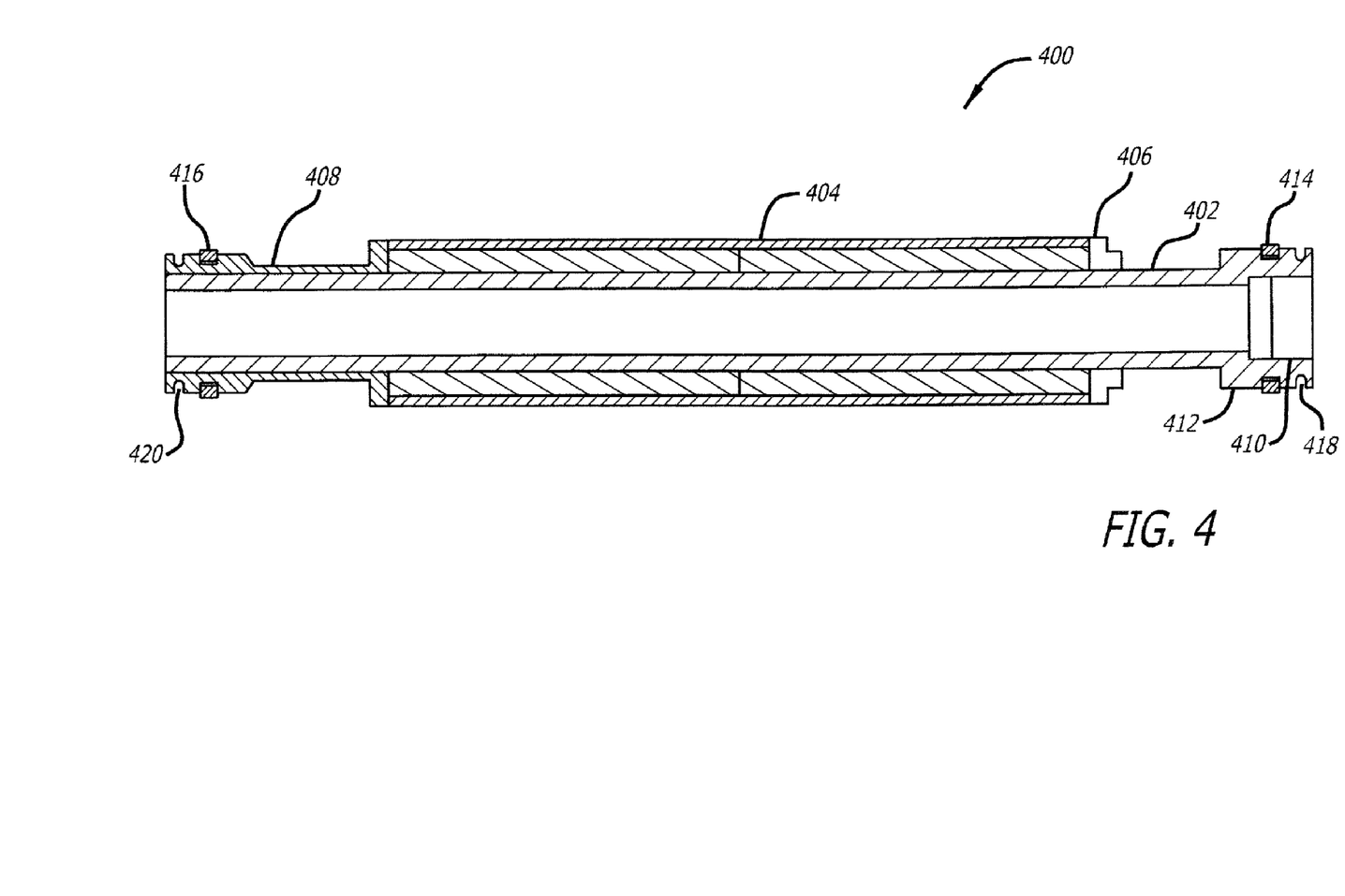
FIG. 4 is a cross-sectional side view of a rotor for an electric generator in an exemplary embodiment of a turbo generator.

The rotor shaft 402 includes a threaded coupling 410 that mates with the threaded coupling 310 on the turbine shaft 304 to connect the two, although other means for coupling the two shafts together may be used. The rotor shaft 402 also includes a head 412 having a first piston ring 414. A second piston ring 416 is located on the second flange 408. The rotor 400 is also shown with first and second slingers 418, 420, respectively, at opposite ends of the rotor shaft 402.

Figure 3:
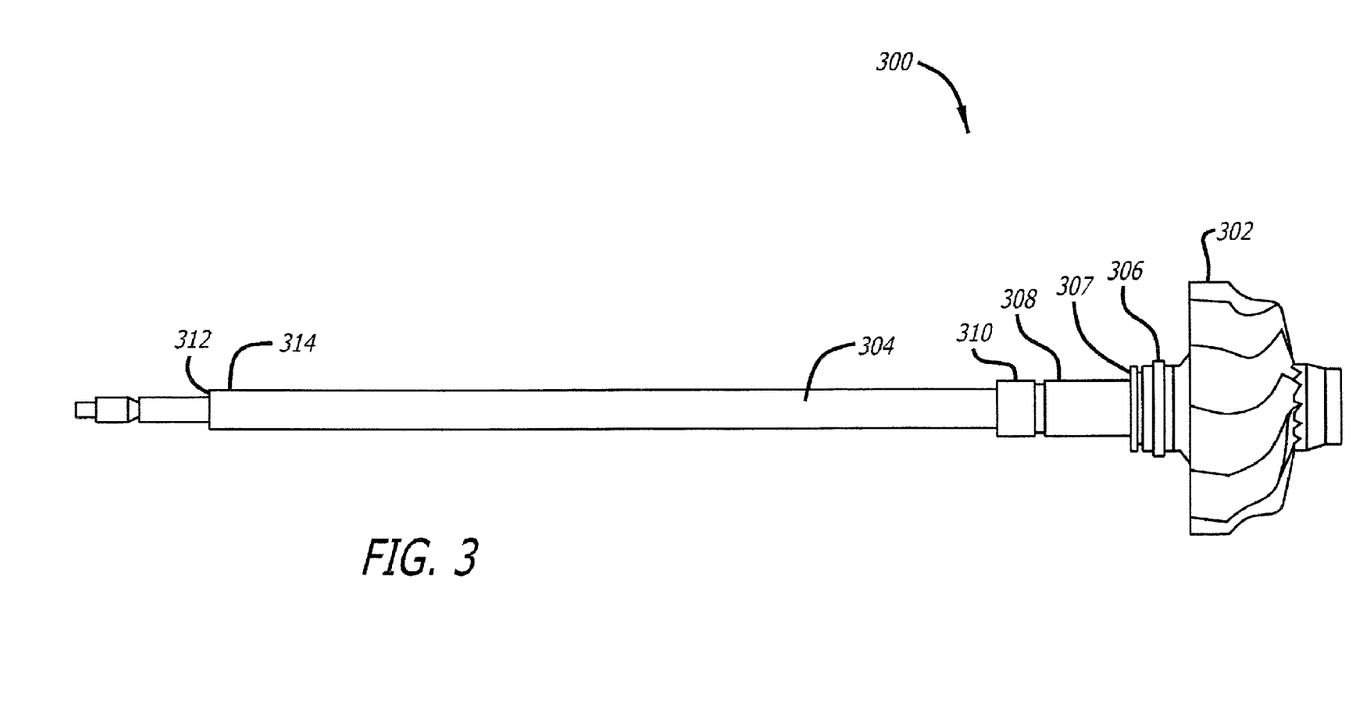
FIG. 3 is a perspective side view of a turbine wheel assembly in an exemplary embodiment of a turbo generator.

The turbine wheel assembly 300 is assembled to the rotor 400 by inserting the distal portion 312 of the turbine shaft 304 into the opening at the head 412 of the rotor 400 until the treaded couplings engage, at which point the turbine wheel assembly 300 may be screwed into the rotor 400. This configuration enables the turbine to "directly power" the rotor, which means that the turbine shaft 304 and the rotor shaft 402 rotate at substantially the same speed. In other words, there is no reduction gear mechanism between the turbine shaft 304 and the rotor shaft 402. Although the turbine shaft 304 is directly coupled to the rotor shaft 402 in the exemplary embodiment described thus far, it is to be understood that a rotor, which is directly powered by a turbine, does not require a direct connection between the turbine shaft 304 and the rotor shaft 402. There may be intermediate or intervening components between the two shafts of a turbine that directly powers a rotor provided that the turbine shaft 304 and the rotor shaft 402 rotate at substantially the same speed. The orientation of the threaded couplings on the shafts are such that when the turbine wheel 302 is rotated by the exhaust gas flowing in the turbine housing section 202, the threaded coupling is tightened.

The turbine shaft 304 is supported by first and second bearings 214, 216. The first bearing 214 is positioned between the first housing section 204 and the first bearing surface 308 on the turbine shaft 304 and the second bearing 216 is positioned between the second housing section 206 and the second bearing surface 314 on the turbine shaft 304. The first and second bearings 214, 216 may be floating journal bearings that rotate in the generator housing section at a rate that is less than the rotational rate of the turbine shaft 304. An axial bearing 218 may be located between the second housing section 206 and the end plate 208 to limit the axial movement of the turbine shaft 304. First and second thrust hubs 220, 222 may be located on opposite sides of the axial bearing 218. A nut 223 may be used to hold the thrust hubs 220, 222 in place against the diameter step-down circular surface of the shaft 304. An end cap 224 is coupled to the end plate 208. The end cap 224 prevents oil leakage from the turbo generator 116.

Figure 5:
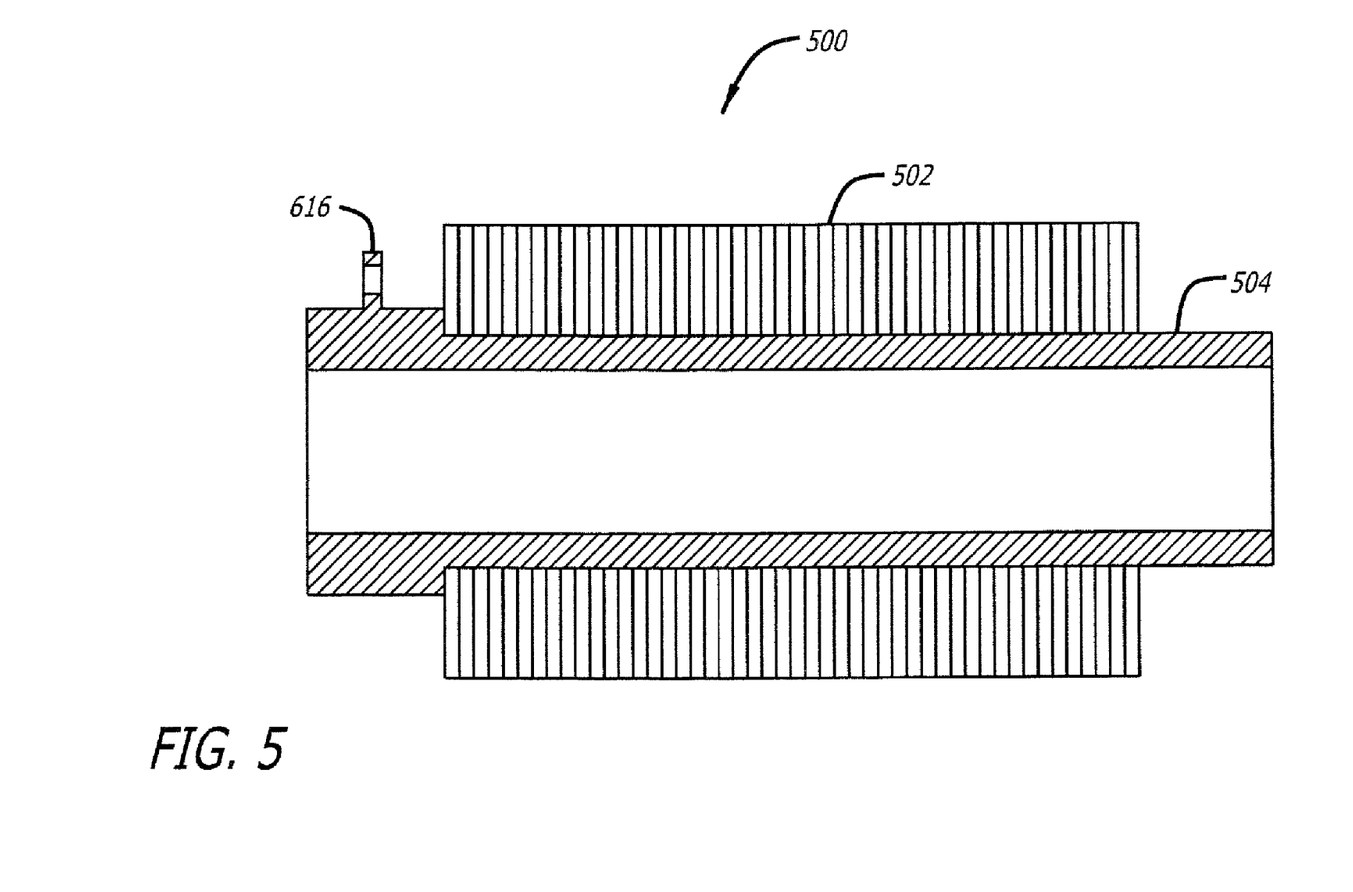
FIG. 5 is a cross-sectional side view of a stator for an electric generator in an exemplary embodiment of a turbo generator.

The stator 500 includes a cylindrical slotless stack 502 assembled from washer shaped steel laminates and a cylindrical coil 504. The slotless stack 502 and the permanent magnet 404 on rotor shaft 402 are arranged as two cylindrically concentric components with the slotless stack 502 serving as part of the magnetic return. The coil 504 may be positioned within a cylindrical gap between the slotless stack 502 and the permanent magnet 404 with the coil 504 extending beyond the two in both axial directions. This gap provides high flux density between the permanent magnet 404 and the slotless stack 502, thus eliminating the need for any magnetic components (e.g., iron) in the coil 504.

The coil 504 may be constructed in a variety of ways. In one exemplary embodiment, the coil 504 is a free-standing ironless coil which has three phase windings that are structurally self sufficient. The phase windings of the free-standing ironless coil do not need to be wound into slots on the magnetic return or interleaved with laminated iron rings. The phase windings may be constructed from two copper sheet metal plates that are cut in a pattern to produce a series of conductive traces. The two copper sheet metal plates are then rolled into inner and outer telescoping cylindrical winding portions with the traces extending along the axial axis. The inner winding portion is wrapped with a continuous fiber stand and inserted into the outer winding portion. Next, the outer winding portion is wrapped with a continuous fiber strand. The inner and outer windings are connected to complete form three phase windings and then impregnated with an encapsulation material. An example of an ironless coil constructed in this fashion is disclosed in U.S. Pat. No. 6,864, 613 B1, assigned to ThinGap LLC, the contents of which is incorporated herein.

Figure 6:
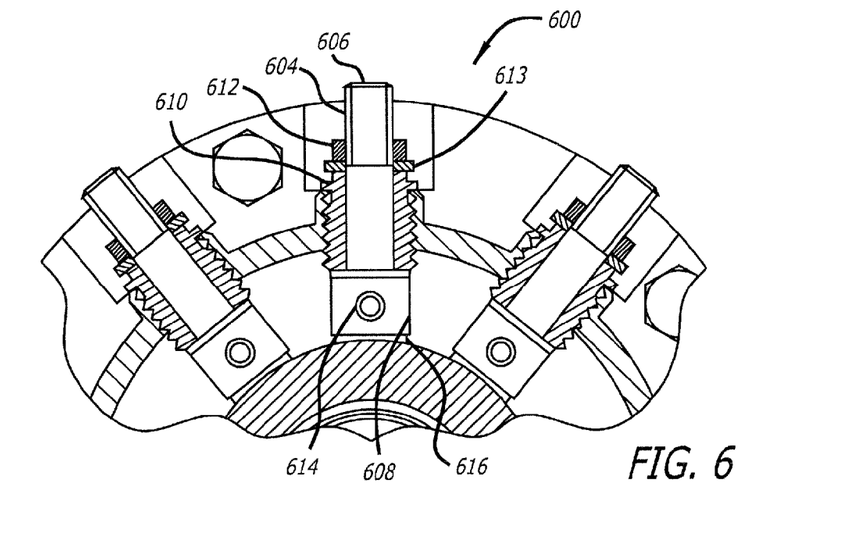
FIG. 6 is a cross-sectional side view of three electrical connector assemblies in an exemplary embodiment of a turbo generator.
Figure 7:
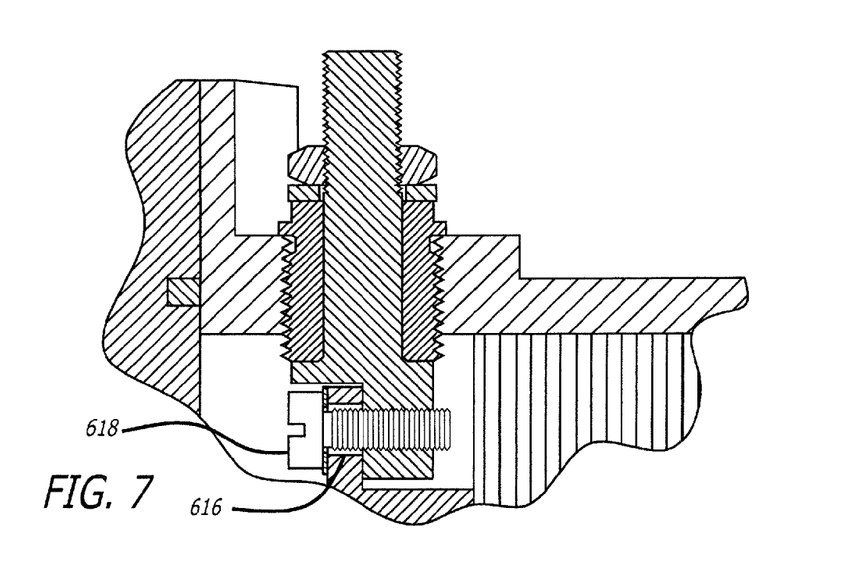
FIG. 7 is a cross-sectional side view of one electrical connector assembly in an exemplary embodiment of a turbo generator.

The stator configuration described above results in a three-phase AC voltage induced in the coil 504 in response to a changing magnetic field produced by the permanent magnet 404 when the rotor shaft 402 is rotated by the turbine. The three phase AC voltage may be provided to the output of the turbo generator through three electrical connector assemblies. The electrical connector assemblies for an exemplary embodiment of a turbo generator are shown in the cross-sectional front view of FIG. 6. Each electrical connector assembly 600 extends from one phase winding of the coil 504 through the first housing section 204. Another view of an electrical connector assembly is shown in FIG. 7.

Each electrical connector assembly 600 includes a stud 604 having a terminal 606 at one end and lip 608 at the opposite end. Between the terminal 606 and the lip 608 is an insulator 610 that prevents the stud 604 from shorting the coil 504 to the second housing section 204. Each electrical connector assembly 600 may be screwed into the second housing portion 104 via a nut 612 on the stud 604. A washer 613 separates the nut 612 from the insulator 610. During installation the stud 604 may be rotated with respect to the insulator 610 to align a hole 614 in the lip 608 with a hole in a lead 616 extending from one of the phase windings of the coil 504. Once aligned, a fastener, such as a screw 618, may be inserted through the holes in the lip 608 and the lead 618 to couple the electrical connector assembly 600 to the coil 504.

Figure 8:
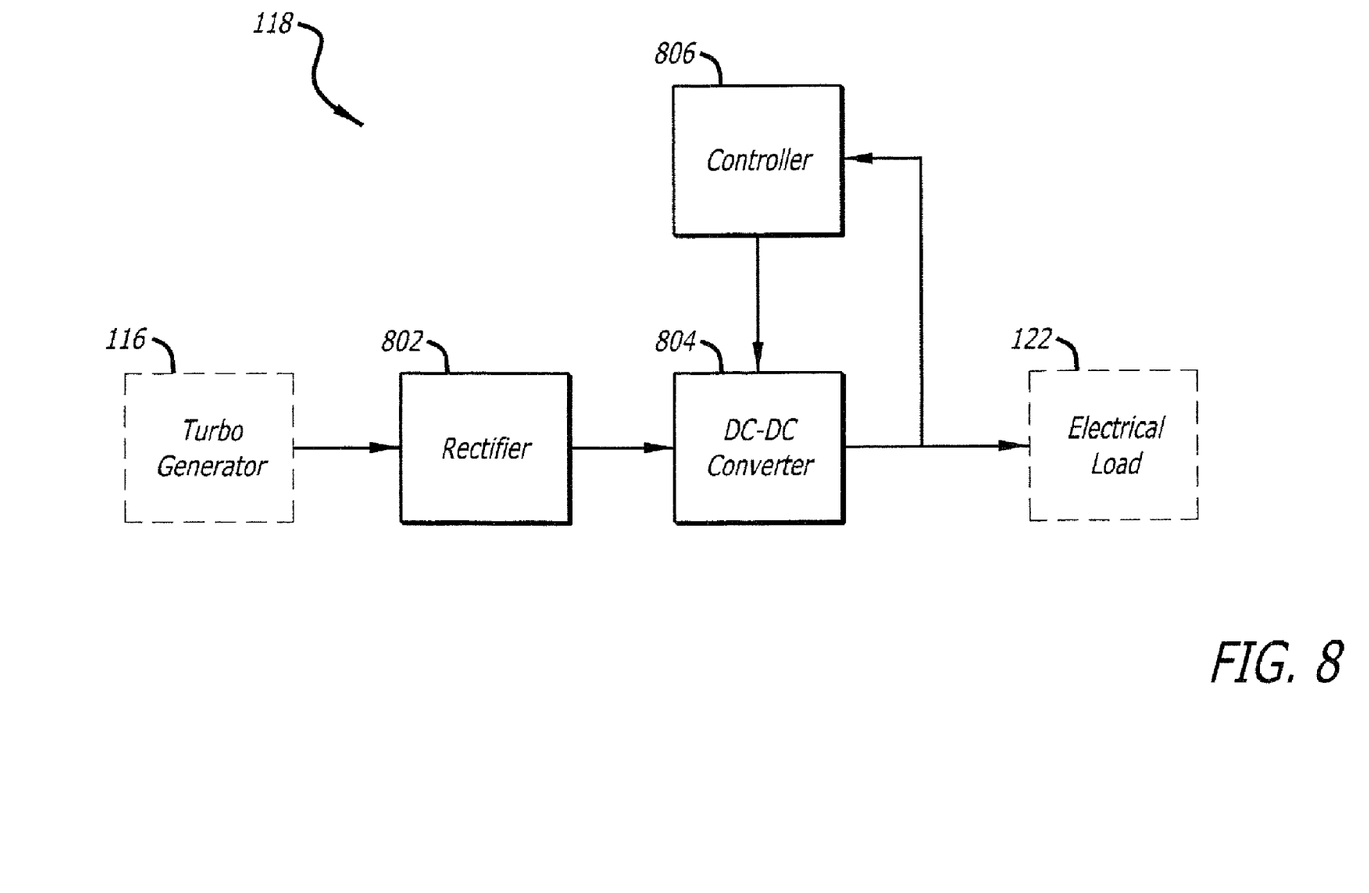
FIG. 8 is a functional block diagram illustrating a regulator in an exemplary embodiment of a turbo generator.

The electrical connector assemblies are coupled to a regulator 118 before being distributed to the electrical load 120 (see FIG. 1). FIG. 8 is a functional block diagram illustrating an exemplary embodiment of a regulator. The regulator 118 includes a diode rectifier 802 to convert the three-phase AC voltage output from the turbo generator 116 to DC voltage. The DC voltage generated by the rectifier 802 is provided to a DC-DC converter 804. The DC-DC converter 804 converts the constantly changing voltage output from the rectifier 802 to the voltage required by the electrical load 122 under changing load conditions. The DC-DC converter 804 may be a buck converter, a boost converter or a buck/boost converter. A controller 806 monitors the output voltage from the DC-DC converter 804 and provides a feedback signal to the DC-DC converter 804 to control the duty cycle of the one or more switches to maintain that output voltage within the range required by the electrical load 122.

The regulator 118 may be physically part of the turbo generator 116 or remote from the turbo generator 116. As an example, of the latter, the regulator 118 may be implemented in the vehicle's electrical system, either as one or more separate components or integrated with one or more other components in the vehicle's electrical system. By way of example, the rectifier 802 and DC-DC converter 804 may be implemented as one or more separate components and the controller 806 may be integrated into the vehicle's on-board computer. Those skilled in the art will be able to determine the appropriate implementation of the regulator 118 depending on the particular application and the overall design constraints imposed on the overall system.

Figure 9:
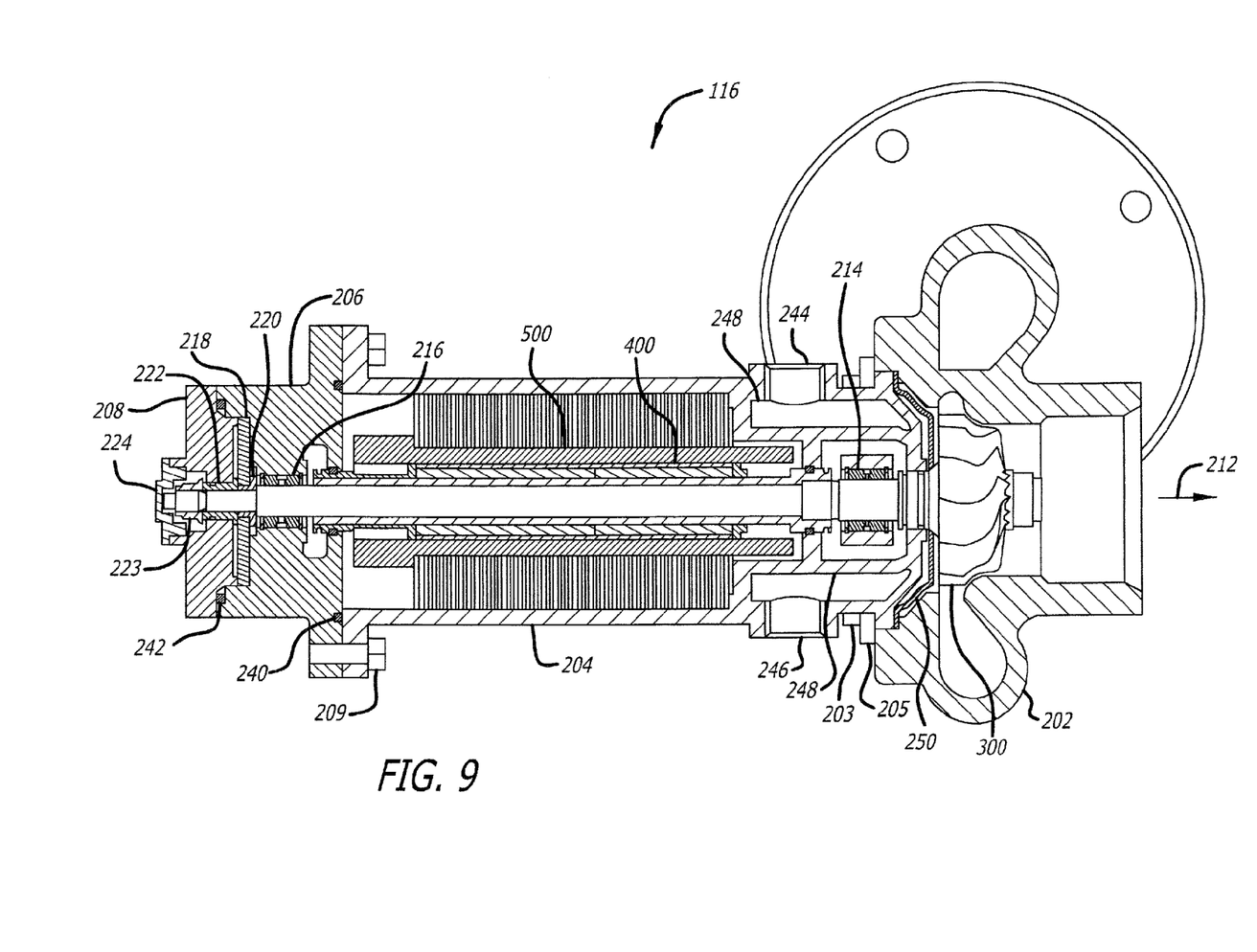
FIG. 9 is a cross-sectional top view of the exemplary embodiment of the turbo generator depicted in FIG. 2.

The turbo generator 116 may also include lubrication and cooling systems, which will now be presented with reference to FIGS. 2 and 9. FIG. 9 is a cross-sectional top view of the turbo generator shown in FIG. 2.

The lubrication system includes a first lubricant inlet port 228 in the first housing section 204 to receive a lubricant from the vehicle's engine lubrication system, and a first lubricant outlet port 232 to return the lubricant back to the vehicle's engine lubrication system. A first lubricant passage 230 includes a passageway from the inlet port 228 to the first bearing 214, and a drainage area from the first bearing 214 to the outlet port 232. The slinger 307 on the turbine shaft 304 and the first slinger 418 on the rotor shaft 402 are used to facilitate removal of excess lubrication from the first bearing 214 area to the drainage area. The piston ring 306 on the turbine shaft 304 prevents lubricant from leaking into the turbine housing portion 202. The first piston ring 414 on the head 412 of the rotor shaft 402 prevents lubricant from leaking into the electric generator.

The first lubricant passage 230 is configured to provide the first bearing 214 with lubricant without extending the length of the housing. This is accomplished by providing auxiliary machining holes in the housing that are closed with slotted headless screws 231, 233 after machining, and drilling the passageway from the inlet port 228 to the first bearing 214 so that it extends horizontally from the inlet port 228 towards the turbine housing section 202 and then extends at an angle other than perpendicular to the axial axes to the first bearing 214.

The lubrication system flier includes a second lubricant inlet port 234 in the second housing section 206 to receive a lubricant from the vehicle's engine lubrication system, and a second lubricant outlet port 236 to return the lubricant back to the vehicle's engine lubrication system. A second lubricant passage 238 includes a passageway from the inlet port 234 to the second bearing 216 and the axial bearing 218. The second lubricant passage 238 also includes a drainage area from the second bearing 216 and axial bearing 218 to the outlet port 236. The second slinger 420 on the second flange 408 of the rotor shaft 402 is used to facilitate removal of excess lubrication from the second bearing 216 area to the drainage area. The second piston ring 416 on the second flange 408 prevents lubricant from leaking into the electric generator. A second seal 242 between the second housing section 206 and the end plate 208 prevents lubricant from leaking to the outside and water intrusion from the outside into the interior defined by the second housing section 206 and the end plate 208. The first seal 240 prevents water intrusion from the outside into the turbo generator 116.

The cooling system includes a pair of coolant ports 244, 246 that are radially offset from the first lubricant inlet and outlet ports 228, 232, respectively, by 90°. The coolant ports 244, 246 are designed to connect a cooling passage 248 in the first housing section 204 to the vehicle's engine cooling system. The cooling passage 248 is used to protect the electric generator, the first lubrication passage 230 in the first housing section 204, and the fast bearing 214 between the turbine shaft 304 and the first housing section 204 from heat generated by the exhaust gas. Additional protection is provided by a heat deflector 250 between the turbine housing section 202 and the first housing section 204.

The coolant passage 248 extends circumferentially around the proximal portion of the turbine shaft 304 in the first housing section 204. The length of the coolant passage in the axial direction extends from the turbine housing section 202 past the end of coil 504 to the slotless stack 502 in the same radial plane as the coolant ports 244, 246. To accommodate the lubrication system, the axial length of the coolant passage 248 is narrowed in the same radial plane as the first lubricant inlet and outlet ports 228, 232.

The various aspects of this disclosure are provided to enable one of ordinary skill in the art to practice the present invention. Modifications to various aspects of a turbo generator presented throughout this disclosure will be readily apparent to those skilled in the art, and the concepts disclosed herein may be extended to other applications with an internal combustion engine exhaust gas source. Thus, the claims are not intended to be limited to the various aspects of a turbo generator presented throughout this disclosure, but are to be accorded the full scope consistent with the language of the claims. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A turbo generator, comprising:
   a housing having a coolant passage having a first circumferentially extending portion in communication with a second circumferentially extending portion, wherein the first circumferentially extending portion has an axial length greater than an axial length of the second circumferentially extending portion, wherein the housing further comprises a coolant port to the first circumferentially extending portion of the coolant passage;
   a lubricant passage and a lubricant port to the lubricant passage, the lubricant port being radially offset from the coolant port;
   a turbine configured to be driven by exhaust gas from an internal combustion engine; and
   an electric generator having a rotor coupled to the turbine and a stator having an ironless coil arranged with the rotor to generate electric power when the rotor is rotated by the turbine.

2. The turbo generator of claim 1 wherein the turbine is configured to directly power the rotor.

3. The turbo generator of claim 1 wherein the rotor further comprises a permanent magnet.

4. The turbo generator of claim 1 wherein the stator further comprises a slotless stack surrounding the rotor, the ironless coil being positioned between the rotor and the slotless stack.

5. The turbo generator of claim 1 wherein the ironless coil comprises concentric inner and outer winding portions coupled together to form three-phase windings, wherein the winding portions are separated by at least one continuous fiber strand wrapped a plurality of times around the inner winding portion and impregnated with an encapsulation material.

6. The turbo generator of claim 1 wherein the turbine comprises a turbine wheel and a turbine shaft extending from the turbine wheel, and wherein the rotor comprises a hollow rotor shaft directly coupled to the turbine shaft.

7. The turbo generator of claim 6 wherein the hollow rotor shaft is directly coupled to the turbine shaft with a threaded connection.

8. The turbo generator of claim 1 further comprising a housing configured to be coupled to an exhaust manifold of the internal combustion engine, and wherein the turbine comprises a turbine wheel arranged within the housing such that the exhaust gas from the exhaust manifold drives the turbine wheel.

9. The turbo generator of claim 8 wherein the housing section further comprises an exhaust port configured to output the exhaust gas used to drive the turbine wheel.

10. The turbo generator of claim 1 wherein the stator further comprises a slotless stack concentric with the ironless coil, wherein the ironless coil extends beyond the slotless stack in both axial directions.

11. The turbo generator of claim 10 further comprising a housing having a coolant passage having a portion that extends circumferentially around a portion of the ironless coil that extends beyond the slotless stack in one of the axial directions.

12. The turbo generator of claim 1 further comprises a housing having coolant and lubricant passages.

13. The turbo generator of claim 1 further comprising a turbine housing section, a generator housing section coupled to the turbine housing section, and a heat deflector between the turbine housing section and the generator housing section.

14. The turbo generator of claim 1 further comprising a housing having a cooling passage configured to be coupled to a vehicle's engine cooling system.

15. The turbo generator of claim 1 wherein the lubricant port is axially offset from the second circumferentially extending portion of the cooling passage.

16. The turbo generator of claim 1 further comprising a housing having a lubricant passage configured to be coupled to a vehicle's engine lubrication system.

17. The turbo generator of claim 1 further comprising a housing having a machined lubricant passage including one or more auxiliary holes that are closed after machining.

18. The turbo generator of claim 1 further comprising a housing having a lubricant passage that extends through the housing at an angle other than perpendicular to an axial axis of the housing.

19. The turbo generator of claim 1 further comprising a housing having a lubricant passage, a bearing in the lubricant passage, and a lubricant port in communication with the lubricant passage, wherein the turbine further comprises a turbine shaft configured to rotate in the bearing, and wherein the lubricant port is axially offset from the bearing.

20. The turbo generator of claim 19 wherein the bearing comprises a floating journal bearing.

21. The turbo generator of claim 1 further comprising a turbo housing section and a generator housing section having first and second housing sections fastened together.

22. The turbo generator of claim 1 further comprising a housing and at least one electrical connector assembly extending from the ironless coil through the housing, wherein each of said at least one electrical connector assembly comprises a stud and an insulator between the stud and the housing.

23. The turbo generator of claim 22 wherein each of said at least one electrical connector assembly is configured such that the stud is rotatable with respect to the insulator before the electrical connector assembly is coupled to the ironless coil.

24. A turbo generator, comprising:
   a housing having a coolant passage having a first circumferentially extending portion in communication with a second circumferentially extending portion, wherein the first circumferentially extending portion has an axial length greater than an axial length of the second circumferentially extending portion;
   a lubricant passage and a lubricant port to the lubricant passage, the lubricant port being radially offset from the coolant port;
   a coolant port to the first circumferentially extending portion of the coolant passage;
   a lubricant passage and a lubricant port to the lubricant passage, the lubricant port being radially offset from the coolant port;
   a turbine configured to be driven by exhaust gas from an internal combustion engine; and
   an electric generator having a rotor coupled to the turbine and a stator having an ironless coil surrounding the rotor.

25. The turbo generator of claim 24 wherein the turbine is configured to directly power the rotor.

26. The turbo generator of claim 24 wherein the rotor further comprises a permanent magnet.

27. The turbo generator of claim 24 wherein the stator further comprises a slotless stack surrounding the rotor, the ironless coil being positioned between the rotor and the slotless stack.

28. The turbo generator of claim 24 wherein the ironless coil comprises concentric inner and outer winding portions coupled together to form three-phase windings, wherein the winding portions are separated by at least one continuous fiber strand wrapped a plurality of times around the inner winding portion and impregnated with an encapsulation material.

29. The turbo generator of claim 24 wherein the turbine comprises a turbine wheel and a turbine shaft extending from the turbine wheel, and wherein the rotor comprises a hollow rotor shaft directly coupled to the turbine shaft.

30. The turbo generator of claim 29 wherein the hollow rotor shaft is directly coupled to the turbine shaft with a threaded connection.

31. The turbo generator of claim 24 further comprising a housing configured to be coupled to an exhaust manifold of the internal combustion engine, and wherein the turbine comprises a turbine wheel arranged within the housing such that the exhaust gas from the exhaust manifold drives the turbine wheel.

32. The turbo generator of claim 31 wherein the housing section further comprises an exhaust port configured to output the exhaust gas used to drive the turbine wheel.

33. The turbo generator of claim 24 wherein the stator further comprises a slotless stack concentric with the ironless coil, wherein the ironless coil extends beyond the slotless stack in both axial directions.

34. The turbo generator of claim 33 further comprising a housing having a coolant passage having a portion that extends circumferentially around a portion of the ironless coil that extends beyond the slotless stack in one of the axial directions.

35. The turbo generator of claim 24 further comprises a housing having coolant and lubricant passages.

36. The turbo generator of claim 24 further comprising a turbine housing section, a generator housing section coupled to the turbine housing section, and a heat deflector between the turbine housing section and the generator housing section.

37. The turbo generator of claim 24 further comprising a housing having a cooling passage configured to be coupled to a vehicle's engine cooling system.

38. The turbo generator of claim 24 wherein the lubricant port is axially offset from the second circumferentially extending portion of the cooling passage.

39. The turbo generator of claim 24 further comprising a housing having a lubricant passage configured to be coupled to a vehicle's engine lubrication system.

40. The turbo generator of claim 24 further comprising a housing having a machined lubricant passage including one or more auxiliary holes that are closed after machining.

41. The turbo generator of claim 24 further comprising a housing having a lubricant passage that extends through the housing at an angle other than perpendicular to an axial axis of the housing.

42. The turbo generator of claim 24 further comprising a housing having a lubricant passage, a bearing in the lubricant passage, and a lubricant port in communication with the lubricant passage, wherein the turbine further comprises a turbine shaft configured to rotate in the bearing, and wherein the lubricant port is axially offset from the bearing.

43. The turbo generator of claim 42 wherein the bearing comprises a floating journal bearing.

44. The turbo generator of claim 24 further comprising a turbo housing section and a generator housing section having first and second housing sections fastened together.

45. The turbo generator of claim 24 further comprising a housing and at least one electrical connector assembly extending from the ironless coil through the housing, wherein each of said at least one electrical connector assembly comprises a stud and an insulator between the stud and the housing.

46. The turbo generator of claim 45 wherein each of said at least one electrical connector assembly is configured such that the stud is rotatable with respect to the insulator before the electrical connector assembly is coupled to the ironless coil.

47. A turbo generator, comprising:
a housing having a coolant passage having a first circumferentially extending portion in communication with a second circumferentially extending portion, wherein the first circumferentially extending portion has an axial length greater than an axial length of the second circumferentially extending portion;
a coolant port to the first circumferentially extending portion of the coolant passage;
a lubricant passage and a lubricant port to the lubricant passage, the lubricant port being radially offset from the coolant port;
a turbine configured to be driven by exhaust gas from an internal combustion engine; and
an electric generator having a rotor coupled to the turbine, and a stator having a slotless stack surrounding the rotor and a coil positioned between the rotor and the slotless stack.

48. The turbo generator of claim 47 wherein the coil comprises an ironless coil.

49. The turbo generator of claim 48 wherein the ironless coil comprises concentric inner and outer winding portions coupled together to form three-phase windings, wherein the winding portions are separated by at least one continuous fiber strand wrapped a plurality of times around the inner winding portion and impregnated with an encapsulation material.

50. The turbo generator of claim 47 wherein the turbine is configured to directly power the rotor.

51. The turbo generator of claim 47 wherein the rotor further comprises a permanent magnet.

52. The turbo generator of claim 47 wherein the turbine comprises a turbine wheel and a turbine shaft extending from the turbine wheel, and wherein the rotor comprises a hollow rotor shaft directly coupled to the turbine shaft.

53. The turbo generator of claim 52 wherein the hollow rotor shaft is directly coupled to the turbine shaft with a threaded connection.

54. The turbo generator of claim 47 further comprising a housing configured to be coupled to an exhaust manifold of the internal combustion engine, and wherein the turbine comprises a turbine wheel arranged within the housing such that the exhaust gas from the exhaust manifold drives the turbine wheel.

55. The turbo generator of claim 54 wherein the housing section further comprises an exhaust port configured to output the exhaust gas used to drive the turbine wheel.

56. The turbo generator of claim 47 wherein the slotless stack is concentric with the coil, and wherein the coil extends beyond the slotless stack in both axial directions.

57. The turbo generator of claim 56 further comprising a housing having a coolant passage having a portion that extends circumferentially around a portion of the coil that extends beyond the slotless stack in one of the axial directions.

58. The turbo generator of claim 47 further comprises a housing having coolant and lubricant passages.

59. The turbo generator of claim 47 further comprising a turbine housing section, a generator housing section coupled to the turbine housing section, and a heat deflector between the turbine housing section and the generator housing section.

60. The turbo generator of claim 47 further comprising a housing having a cooling passage configured to be coupled to a vehicle's engine cooling system.

61. The turbo generator of claim 47 wherein the lubricant port is axially offset from the second circumferentially extending portion of the cooling passage.

62. The turbo generator of claim 47 further comprising a housing having a lubricant passage configured to be coupled to a vehicle's engine lubrication system.

63. The turbo generator of claim 47 further comprising a housing having a machined lubricant passage including one or more auxiliary holes that are closed after machining.

64. The turbo generator of claim 47 further comprising a housing having a lubricant passage that extends through the housing at an angle other than perpendicular to an axial axis of the housing.

65. The turbo generator of claim 47 further comprising a housing having a lubricant passage, a bearing in the lubricant passage, and a lubricant port in communication with the lubricant passage, wherein the turbine further comprises a turbine shaft configured to rotate in the bearing, and wherein the lubricant port is axially offset from the bearing.

66. The turbo generator of claim 65 wherein the bearing comprises a floating journal bearing.

67. The turbo generator of claim 47 further comprising a turbo housing section and a generator housing section having first and second housing sections fastened together.

68. The turbo generator of claim 47 further comprising a housing and at least one electrical connector assembly extending from the coil through the housing, wherein each of said at least one electrical connector assembly comprises a stud and an insulator between the stud and the housing.

69. The turbo generator of claim 68 wherein each of said at least one electrical connector assembly is configured such that the stud is rotatable with respect to the insulator before the electrical connector assembly is coupled to the coil.

70. A turbo generator, comprising:
means for converting exhaust gas energy from an internal combustion engine to rotary power, wherein the converting means comprises a housing having a coolant passage having a first circumferentially extending portion in communication with a second circumferentially extending portion, wherein the first circumferentially extending portion has an axial length greater than an axial length of the second circumferentially extending portion
a coolant port to the first circumferentially extending portion of the coolant passage
a lubricant passage and a lubricant port to the lubricant passage, the lubricant port being radially offset from the coolant port; and
means for converting the rotary power to electric power using an ironless coil.

71. The turbo generator of claim 70 wherein the means for converting exhaust gas energy from an internal combustion engine to rotary power comprises a turbine, and the means for converting the rotary power to electric power comprises an electric generator.

72. A vehicle, comprising:
an internal combustion engine; and
a turbo generator having a turbine configured to be driven by exhaust gas from the internal combustion engine wherein the turbine generator comprises:
a cooling system comprising;
a housing having a coolant passage having a first circumferentially extending portion in communication with a second circumferentially extending portion, wherein the first circumferentially extending portion has an axial length greater than an axial length of the second circumferentially extending portion;
a coolant port to the first circumferentially extending portion of the coolant passage;
a lubricant passage and a lubricant port to the lubricant passage, the lubricant port being radially offset from the coolant port; and
an electric generator having a rotor coupled to the turbine and a stator having an ironless coil arranged with the rotor to generate electric power when the rotor is rotated by the turbine.

73. The vehicle of claim 72 wherein the turbine is configured to provide power to the rotor.

74. The vehicle of claim 72 wherein the rotor further comprises a permanent magnet.

75. The vehicle of claim 72 wherein the stator further comprises a slotless stack surrounding the rotor, the ironless coil being positioned between the rotor and the slotless stack.

76. The vehicle of claim 72 wherein the turbine comprises a turbine wheel and a turbine shaft extending from the turbine wheel, and wherein the rotor comprises a hollow rotor shaft directly coupled to the turbine shaft.

77. The vehicle of claim 76 wherein the hollow rotor shaft is directly coupled to the turbine shaft with a threaded connection.

78. The vehicle of claim 72 wherein the cooling system is configured to provide coolant to the internal combustion engine and the turbo generator.

79. The vehicle of claim 72 further comprising a lubrication system configured to provide lubricant to the internal combustion engine and the turbo generator.

* * * * *